United States Patent
Kaneko

(10) Patent No.: US 7,228,399 B2
(45) Date of Patent: Jun. 5, 2007

(54) CONTROL METHOD FOR STORAGE DEVICE CONTROLLER SYSTEM, AND STORAGE DEVICE CONTROLLER SYSTEM

(75) Inventor: Seiji Kaneko, Zama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/386,237

(22) Filed: Mar. 21, 2006

(65) Prior Publication Data

US 2006/0168362 A1 Jul. 27, 2006

Related U.S. Application Data

(63) Continuation of application No. 10/656,493, filed on Sep. 5, 2003, now Pat. No. 7,047,388.

(30) Foreign Application Priority Data

Jan. 28, 2000 (JP) ............................... 2000-029635
Dec. 6, 2002 (JP) ............................... 2002-354842

(51) Int. Cl.
*G06F 12/00* (2006.01)
(52) U.S. Cl. .................. 711/170; 711/111; 711/154
(58) Field of Classification Search ............... 711/170, 711/154, 111
See application file for complete search history.

(56) References Cited

U.S. PATENT DOCUMENTS

| | | |
|---|---|---|
| 5,717,956 A | 2/1998 | Shinosaka et al. |
| 5,887,199 A | 3/1999 | Ofer et al. |
| 5,920,893 A | 7/1999 | Nakayama et al. |
| 6,041,386 A | 3/2000 | Bello |
| 6,425,051 B1 | 7/2002 | Burton et al. |
| 6,571,362 B1 | 5/2003 | Crater et al. |
| 6,614,984 B2 | 9/2003 | Rigatti |
| 6,675,260 B2 | 1/2004 | Torrey et al. |
| 6,735,676 B1 | 5/2004 | Kanda et al. |
| 6,789,166 B2 | 9/2004 | Kamise et al. |
| 6,950,917 B2 | 9/2005 | Nagasawa et al. |
| 2001/0052037 A1 | 12/2001 | Terasaki et al. |
| 2003/0221077 A1 | 11/2003 | Ohno et al. |

(Continued)

FOREIGN PATENT DOCUMENTS

JP   2000-029635   1/2000

(Continued)

*Primary Examiner*—Jack A. Lane
(74) *Attorney, Agent, or Firm*—Townsend and Townsend and Crew LLP

(57) ABSTRACT

The present invention provides a control method for a storage device controller system provided with a first storage device controller that is connected to first and second storage devices storing data in the CKD format and the FBA format, respectively, and that has first and second communications control means that receive data input/output requests from a mainframe computer and an open system computer, respectively, and a second storage device that is connected to a third storage device storing data in the CKD format and that has third communications means connected to the second communications means, wherein the first storage device controller transmits a command to the second storage device controller if a data read request received from the open system computer is for data stored on the third storage device, and transmits the data that are read out from the third storage device by the second storage device controller to the open system computer.

19 Claims, 6 Drawing Sheets

U.S. PATENT DOCUMENTS

| | | |
|---|---|---|
| 2003/0229764 A1 | 12/2003 | Ohno et al. |
| 2004/0044803 A1 | 3/2004 | Mashima |
| 2004/0088507 A1 | 5/2004 | Satoyama et al. |
| 2004/0107325 A1 | 6/2004 | Mori |
| 2004/0210713 A1 | 10/2004 | Kanai |
| 2005/0120093 A1 | 6/2005 | Nakano et al. |

FOREIGN PATENT DOCUMENTS

| | | |
|---|---|---|
| JP | 2002027373 A | 1/2002 |

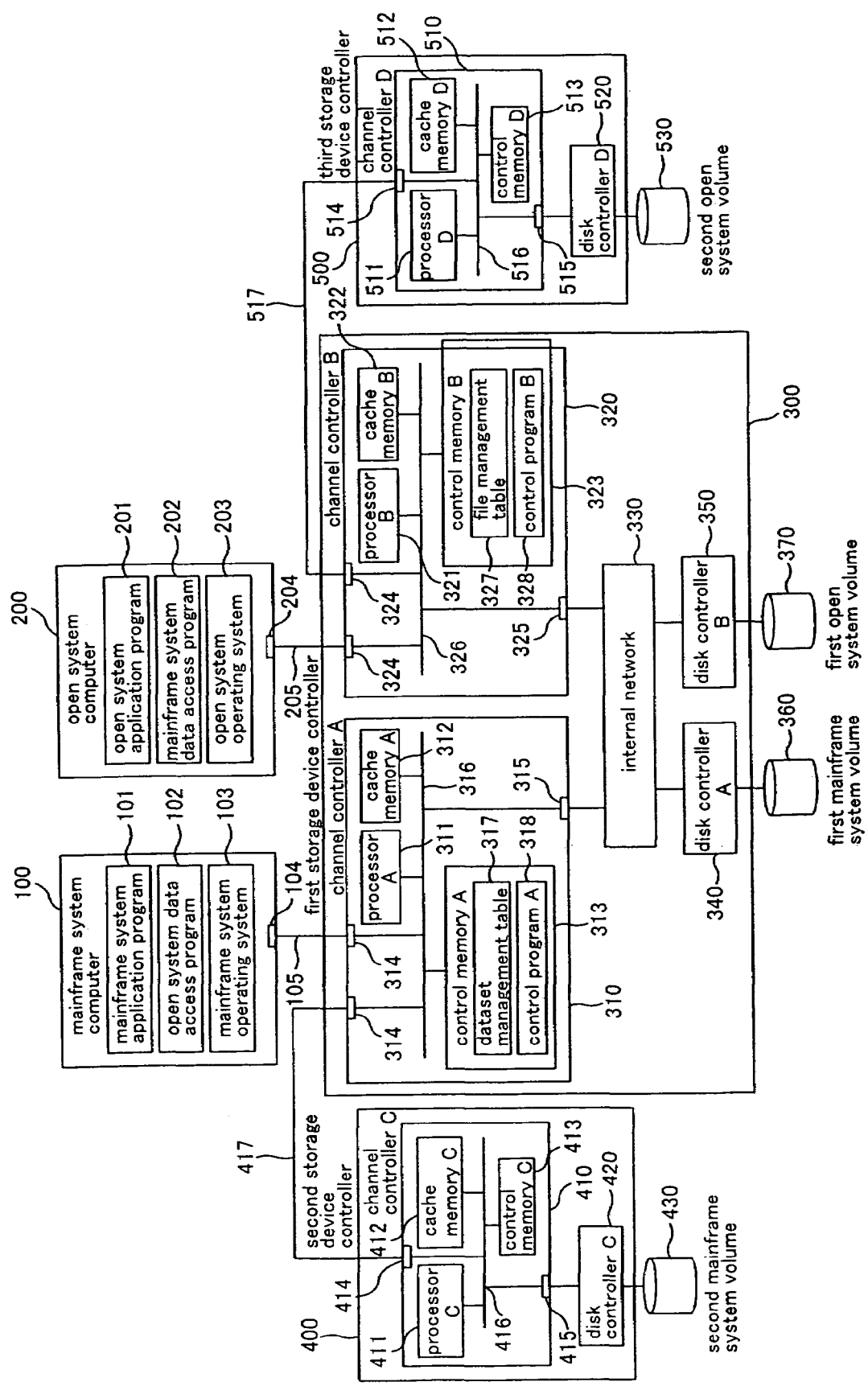
[Fig.1]

317

| dataset name | volume number | volume location | data location | | |
|---|---|---|---|---|---|
| | | | cylinder number | head number | record number |
| "aaa" | 1 | 1 | 3 | 1 | 10 |
| "bbb" | 2 | 2 | 10 | 2 | 3 |
| "ccc" | 1 | 1 | 4 | 4 | 5 |
| ⋮ | ⋮ | ⋮ | ⋮ | ⋮ | ⋮ |

| file name | volume number | volume location | data location |
|---|---|---|---|
| | | | LBA |
| "xxx" | 10 | 1 | 3A2F |
| "yyy" | 10 | 1 | 5C7E |
| ⋮ | ⋮ | ⋮ | ⋮ |

【Fig.3】

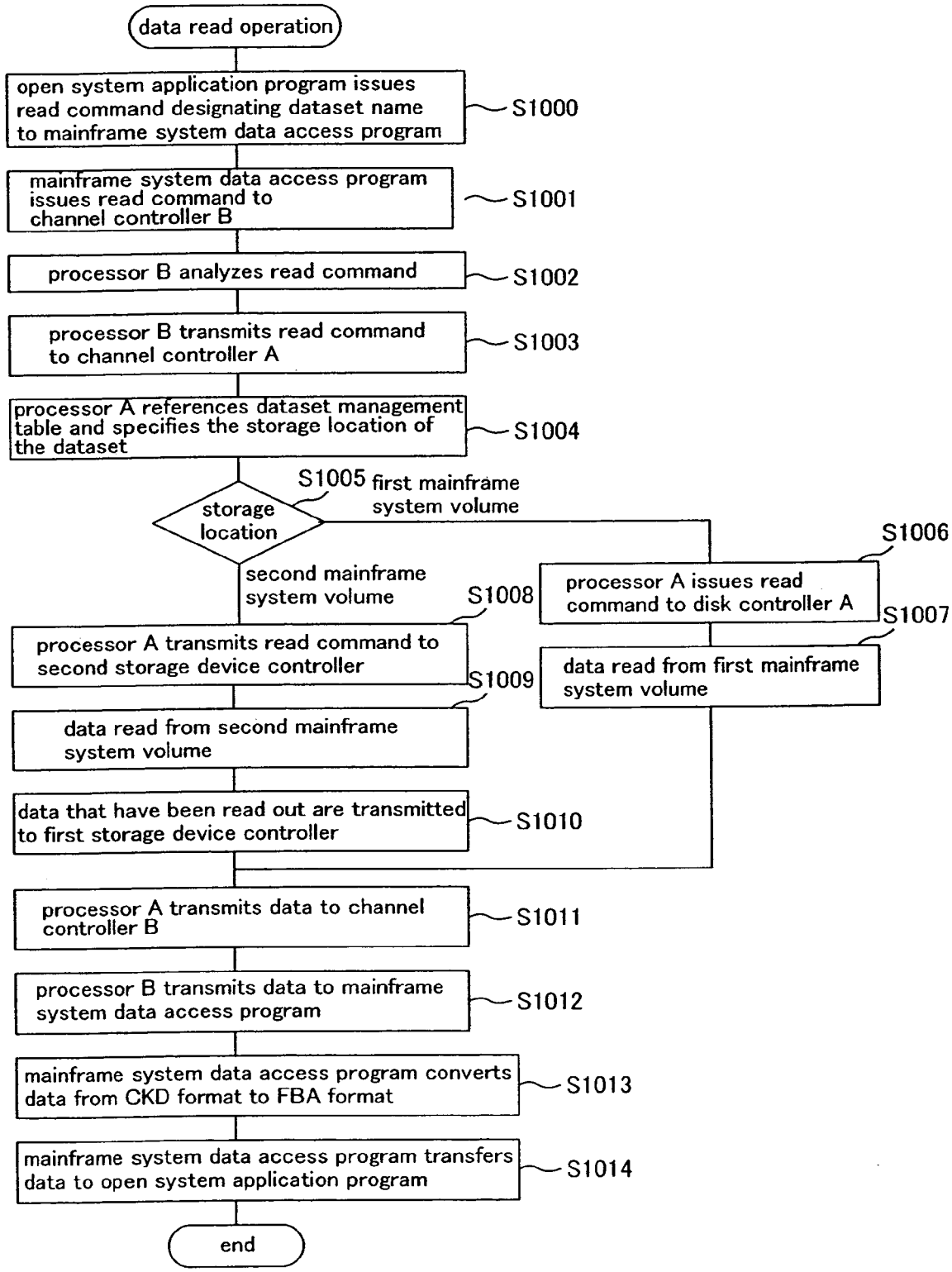
[Fig.4]

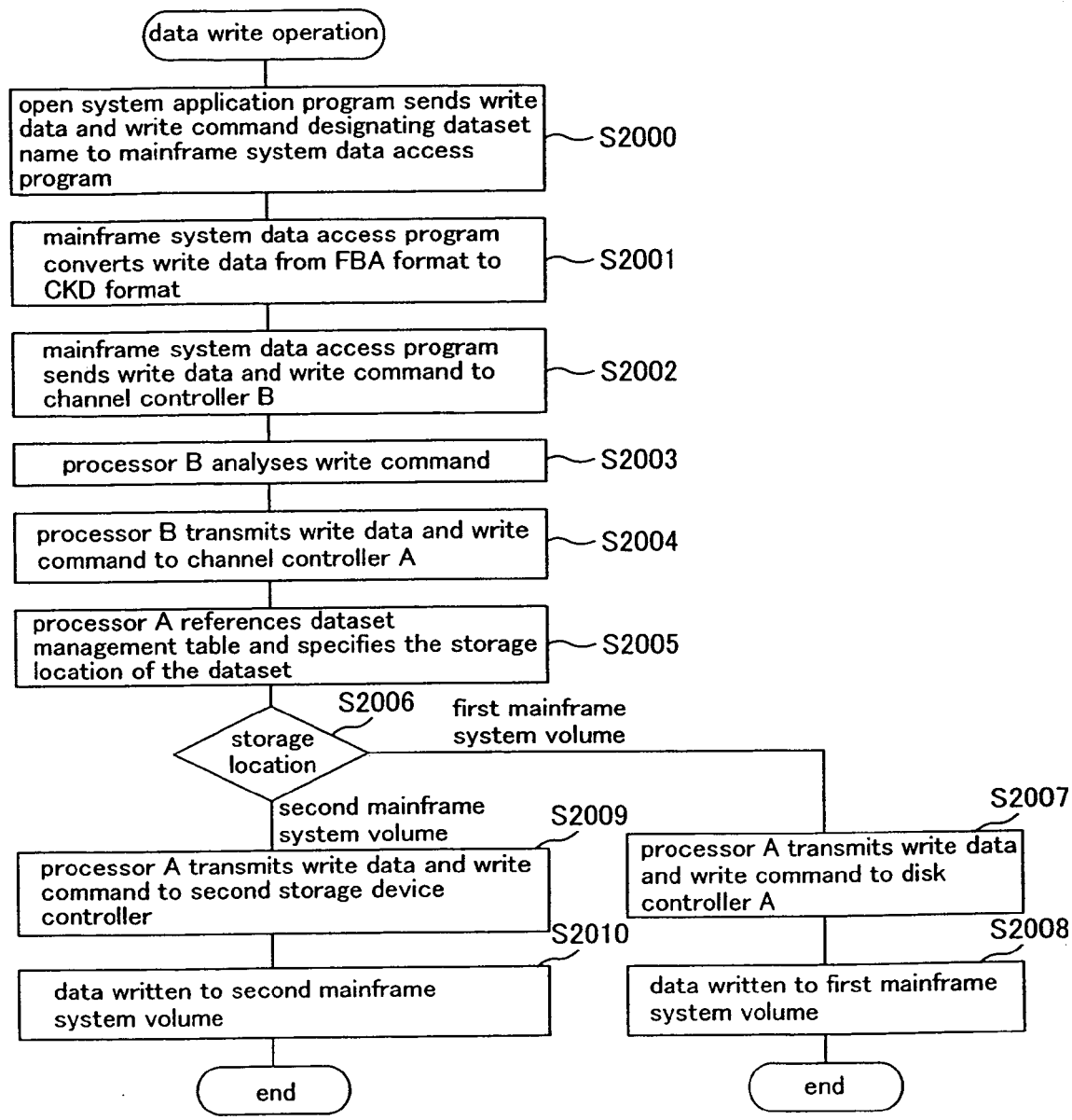
[Fig.5]

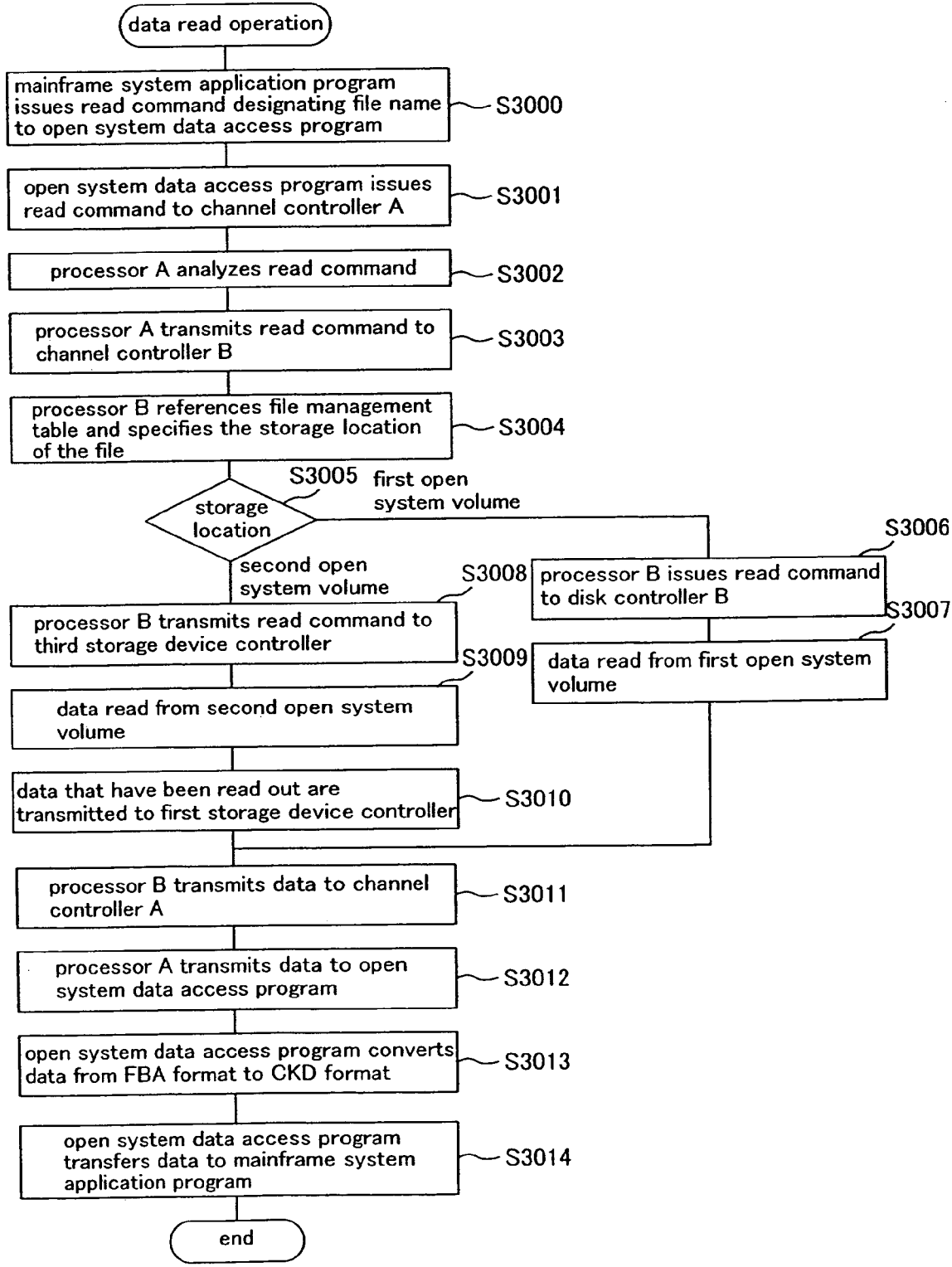
[Fig.6]

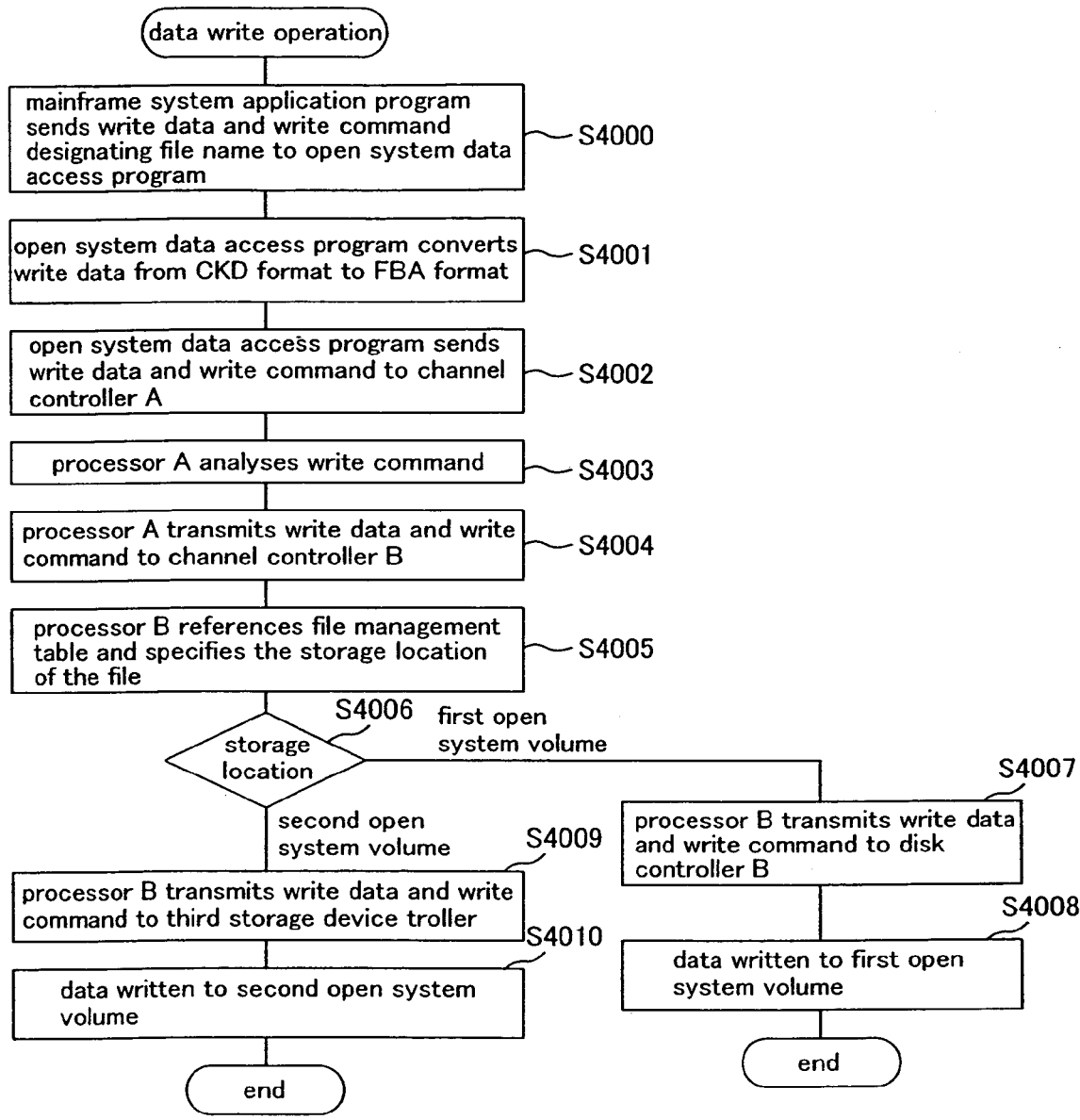
[Fig.7]

CONTROL METHOD FOR STORAGE DEVICE CONTROLLER SYSTEM, AND STORAGE DEVICE CONTROLLER SYSTEM

CROSS-REFERENCE TO RELATED APPLICATION

The present application is based on Japanese Patent Application No. 2002-354842 filed in Japan on Dec. 6, 2002, which is herein incorporated by reference.

BACKGROUND OF THE INVENTION

1. Field of the Invention

The present invention relates to control methods for storage device controller systems and to storage device controller systems.

2. Description of the Related Art

In recent years, computer systems have come to handle extremely large amounts of information. Moreover, large amounts of storage data have accumulated as the result of the long years of operation of computer systems. Thus, the technology of storage consolidation has been developed to effectively utilize these large amounts of storage information. Storage consolidation is a technology for coordinating the management of storage apparatuses that to date have been operated separately for each computer system so as to consolidate and manage the large amount of storage information that has been stored separately in each storage apparatus.

An example of such a technology relates to a storage apparatus that can handle a plurality of transfer block sizes for data sent and received between the storage apparatus and a computer, allowing computers by various manufactures to be connected through a single storage apparatus.

The technology, however, is for a storage device that allows the transfer block size to be selected when the device is initialized. Consequently, although it allows computers by various manufactures with different transfer block sizes to be connected, the computers by these manufactures cannot be combined and operated at the same time.

SUMMARY OF THE INVENTION

Possible methods for introducing a new storage control device include a method for completely shifting from operation of the old storage control device to only the newly introduced storage control device, and a method for operating the old storage control device and the newly introduced storage device side by side. If shifting between or jointly using storage control devices having an FICON (registered trademark) interface for the mainframe, however, it becomes necessary to convert the recording format within the storage control devices, and it may be difficult to introduce new storage control devices. This is because the data format known as CKD (count key data) that is used by the mainframe is different from the FBA (fixed block architecture) data format that is used in storage control devices, and these two data formats are converted and controlled within a storage system. Therefore, requests from the mainframe host received by the FICON (registered trademark) interface cannot be relayed to other storage control devices.

If the data of a mainframe computer, with large amounts of accumulated data, and the data of open system computers, which have quickly become popular due to the miniaturization of computers in recent years, are to be shared, then since the data of the mainframe computer and the data of open system computers are stored on storage control devices in different formats that are not compatible, there arises the need to transfer data stored on the storage control device to another storage control device prior to sharing, and in particular to a storage control device that is already shared.

Accordingly, it is a main object of the present invention to provide a control method for a storage device controller system and a storage device controller system that allow existing storage devices to be accessed regardless of the computer type.

A control method for a storage device controller system, wherein the storage device controller system comprises a first storage device controller having first input/output control means for performing input/output processing with respect to a first storage device storing data in accordance with a first recording format, second input/output control means for performing input/output processing with respect to a second storage device storing data in accordance with a second recording format, first communications control means for receiving data input/output requests from a first information processing device for accessing data stored on the first storage device, and second communications control means for receiving data input/output requests from a second information processing device for accessing data stored on the second storage device, and a second storage device controller having third input/output control means for performing input/output processing with respect to a third storage device storing data in accordance with the second recording format, and third communications control means for receiving input/output requests with respect to data stored on the third storage device, and the second communications control means and the third communications control means are connected, wherein the control method for a storage device controller system comprises a step in which the first storage device controller receives a data read request from the first information processing device, a step in which the first storage device controller determines that the data read request is for data stored on the third storage device, a step in which the first storage device controller transmits the data read request to the second storage device controller if it is determined that the data read request is for data stored on the third storage device, a step in which the second storage device controller reads out data stored on the third storage device and transmits the data to the first storage device controller, and a step in which the first storage device controller transmits the data to the first information processing device.

Other problems and methods for solving the same that are disclosed by the present application will be made clearer through the description of the embodiments and the drawings of the present invention.

With the present invention, it is possible to provide a control method for a storage device controller system and a storage device controller system that allow existing storage devices to be accessed regardless of the computer type.

BRIEF DESCRIPTION OF THE DRAWINGS

Preferred embodiments of the present invention will now be described in conjunction with the accompanying drawings, in which:

FIG. 1 is a block diagram showing the overall configuration of the storage device controller system according to the present embodiment;

FIG. 2 is a diagram showing the dataset management table according to the present embodiment;

FIG. 3 is a diagram showing the file management table according to the present embodiment;

FIG. 4 is a flowchart showing the flow of the operation in a case where an open system computer reads the data of a storage volume in the CKD format according to the present embodiment;

FIG. 5 is a flowchart showing the flow of the operation in a case where an open system computer writes data to a storage volume in the CKD format according to the present embodiment;

FIG. 6 is a flowchart showing the flow of the operation in a case where a mainframe system computer reads the data of a storage volume in the FBA format according to the present embodiment; and FIG. 7 is a flowchart showing the flow of the operation in a case where a mainframe system computer writes data to a storage volume in the FBA format according to the present embodiment.

DETAILED DESCRIPTION OF THE INVENTION

=== Overview of the Disclosure ===

At least the following matters will be made clear by the explanation in the present specification.

A first configuration of the present embodiment is a control method for a storage device controller system, wherein the storage device controller system is provided with a first storage device controller having first input/output control means for performing input/output processing with respect to a first storage device storing data in accordance with a first recording format, second input/output control means for performing input/output processing with respect to a second storage device storing data in accordance with a second recording format, first communications control means for receiving data input/output requests from a first information processing device for accessing data stored on the first storage device, and second communications control means for receiving data input/output requests from a second information processing device for accessing data stored on the second storage device, and a second storage device controller having third input/output control means for performing input/output processing with respect to a third storage device storing data in accordance with the second recording format, and third communications control means for receiving input/output requests with respect to data stored on the third storage device, and the second communications control means and the third communications control means are connected, and wherein the control method for a storage device controller system includes a step in which the first storage device controller receives a data read request from the first information processing device, a step in which the first storage device controller determines that the data read request is for data stored on the third storage device, a step in which the first storage device controller transmits the data read request to the second storage device controller if it is determined that the data read request is for data stored on the third storage device, a step in which the second storage device controller reads out data stored on the third storage device and transmits the data to the first storage device controller, and a step in which the first storage device controller transmits the data to the first information processing device.

With this configuration, if a storage device controller is newly introduced to existing storage device controllers, for example, then the information stored on the old storage device controllers can be read via the new storage device controller regardless of the recording format of the data of the old storage device controllers. Here, the information stored on the old storage device controllers can be read out via the new storage device controller without altering the specifications or modifying the old storage device controllers or transferring the data stored on the storage device controllers, for example.

A further configuration of the present embodiment is a control method for a storage device controller system, wherein the storage device controller system is provided with a first storage device controller having first input/output control means for performing input/output processing with respect to a first storage device storing data in accordance with a first recording format, second input/output control means for performing input/output processing with respect to a second storage device storing data in accordance with a second recording format, first communications control means for receiving data input/output requests from a first information processing device for accessing data stored on the first storage device, and second communications control means for receiving data input/output requests from a second information processing device for accessing data stored on the second storage device, and a second storage device controller having third input/output control means for performing input/output processing with respect to a third storage device storing data in accordance with the second recording format, and third communications control means for receiving input/output requests with respect to data stored on the third storage device, wherein the second communications control means and the third communications control means are connected, and the control method for a storage device controller system includes a step in which the first storage device controller receives a data write request from the first information processing device, a step in which the first storage device controller determines that the data write request is for the third storage device, a step in which the first storage device controller transmits the data write request to the second storage device controller if it is determined that the data write request is for the third storage device, a step in which the first storage device controller transmits write data received from the first information processing device to the second storage device controller, and a step in which the second storage device controller writes the write data to the third storage device.

With this configuration, if a storage device controller is newly introduced to existing storage device controllers, for example, then data can be written to the old storage device controllers through the new storage device controller regardless of the recording format of the data of the old storage device controllers. Here, data can be written to the old storage device controllers through the new storage device controller without altering the specifications or modifying the old storage device controllers or transferring the data stored on the storage device controllers, for example.

In a further configuration of the present embodiment, in the control method for a storage device controller system, the step in which the first storage device controller transmits the data to the first information processing device has a step in which the first storage device controller transmits the data to the first information processing device after converting them to data in accordance with the first recording format.

With this configuration, if information stored on the second storage device controller is read out via the first storage device controller, the first storage device controller performs conversion of the recording format, and thus it is no longer necessary for the first information processing device to perform such conversion of the recording format.

In a further configuration of the present embodiment, in the control method for a storage device controller system, the step in which the first storage device controller transmits write data received from the first information processing device to the second storage device controller has a step in which the first storage device controller transmits the write data received from the first information storage device to the second storage device controller after converting them to data in accordance with the second recording format.

With this configuration, if information is to be written to the second storage device controller via the first storage device controller, then the first storage device controller performs conversion of the recording format, and thus it is no longer necessary for the first information processing device to perform such conversion of the recording format.

In a further configuration of the present embodiment, in the control method for a storage device controller system, the first and the second recording formats are the FBA format and the CKD format, respectively.

With this configuration, it is possible to access data stored on a storage device controller storing data in the CKD format from an open system computer storing data in the FBA format.

In a further configuration of the present embodiment, in the control method for a storage device controller system, the first and the second recording formats are the CKD format and the FBA format, respectively.

With this configuration, it is possible to access data stored on a storage device controller storing data in the FBA format from a mainframe computer storing data in the CKD format.

A further configuration of the present embodiment is a storage device controller system that comprises a first storage device controller having first input/output control means for performing input/output processing with respect to a first storage device storing data in accordance with a first recording format, second input/output control means for performing input/output processing with respect to a second storage device storing data in accordance with a second recording format, first communications control means for receiving data input/output requests from a first information processing device for accessing data stored on the first storage device, and second communications control means for receiving data input/output requests from a second information processing device for accessing data stored on the second storage device, and a second storage device controller having third input/output control means for performing input/output processing with respect to a third storage device storing data in accordance with the second recording format, and third communications control means for receiving input/output requests with respect to data stored on the third storage device, and the second communications control means and the third communications control means are connected, wherein the first storage device controller comprises means for receiving a data read request from the first information processing device, means for determining that the data read request is for data stored on the third storage device, means for transmitting the data read request to the second storage device controller if it is determined that the data read request is for data stored on the third storage device, and means for transmitting to the first information processing device the data stored on the third storage device that are transmitted from the second storage device controller, and the second storage device controller comprises means for reading out data stored on the third storage device and transmitting the data to the first storage device controller due to the data read request that is transmitted from the first storage device controller.

A further configuration of the present embodiment is a storage device controller system that comprises a first storage device controller having first input/output control means for performing input/output processing with respect to a first storage device storing data in accordance with a first recording format, second input/output control means for performing input/output processing with respect to a second storage device storing data in accordance with a second recording format, first communications control means for receiving data input/output requests from a first information processing device for accessing data stored on the first storage device, and second communications control means for receiving data input/output requests from a second information processing device for accessing data stored on the second storage device, and a second storage device controller having third input/output control means for performing input/output processing with respect to a third storage device storing data in accordance with the second recording format, and third communications control means for receiving input/output requests with respect to data stored on the third storage device, and the second communications control means and the third communications control means are connected, wherein the first storage device controller comprises means for receiving a data write request from the first information processing device, means for determining that the data write request is for the third storage device, means for transmitting the data write request to the second storage device controller if it is determined that the data write request is for the third storage device, and means for transmitting write data that are received from the first information processing device to the second storage device controller, and the second storage device controller comprises means for writing the write data to the third storage device.

Another configuration of the present embodiment relates to the first storage device controller in the storage device controller system.

A further configuration of the present invention relates to a program for executing the above functions on the first storage device controller of the storage device controller system.

=== Example of the Overall Configuration ===

Hereinafter, embodiments of the present invention will be described in detail using the drawings.

First, FIG. 1 shows a block diagram of the overall configuration of the storage device controller system according to this embodiment.

A mainframe computer 100 is a computer (information processing device) provided with a CPU (central processing unit) and a memory, for example. The mainframe computer 100 is connected to a control terminal (not shown), and receives commands from the control terminal and executes predetermined programs. For example, it may be used as the central computer of a large-scale computer system, such as an automatic teller system of a bank or an airplane seat reservation system. A mainframe system application program 101 is executed on the mainframe computer 100 under the control of a mainframe system operating system 103.

On the other hand, an open system computer 200 is also a computer (information processing device) provided with a CPU and a memory, for example. The open system computer 200 is manufactured according to publicly known technical standards, and is characterized in that as long as the standard matches, devices from different manufacturers can be connected to it and used. Also, the reduction in size of computers in recent years has led to tasks that were conventionally carried out on the mainframe computer 100 to be carried out on the open system computer 200. An open system application program 201 is executed on the open system computer 200 under the control of an open system operating system 203.

The mainframe computer 100 and the open system computer 200 are both connected to a first storage device controller 300. The first storage device controller 300 is provided with a first mainframe system volume (storage device) 360 and a first open system volume (storage device) 370, which store the data of the mainframe computer 100 and the open system computer 200, respectively.

The mainframe computer 100 traditionally stores data in the CKD (count key data) format on the first mainframe system volume 360. In the CKD format, the data storage address is designated by the cylinder number, the head number, and the record number. On the other hand, the open system computer 200 stores data in the FBA (fixed block architecture) format on the first open system volume 370. In the FBA format, the data storage address is designated by the LBA (logical block address).

Consequently, the mainframe computer 100 cannot directly access data stored on the first open system volume 370 and the open system computer 200 cannot directly access data stored on the fist mainframe system volume 360.

To access data stored on the first open system volume 370 from the mainframe computer 100, it is necessary to make the data stored in the FBA format able to be treated as data in the CKD format. An open-system data access program 102 that is executed on the mainframe computer 100 is a program for allowing data stored in the FBA format on the first open system volume 370 to be accessed from the mainframe computer 100. The mainframe system application program 101 can access data stored in the FBA format by carrying out data access via the open system data access program 102.

At the same time, to access data stored on the first mainframe system volume 360 from the open system computer 200, it is necessary to make the data stored in the CKD format able to be treated as data in the FBA format. By carrying out data access via a mainframe system data access program 202 that is executed on the open system computer 200, the open system application program 201 can access data stored in the CKD format.

With the technology described above, the first mainframe system volume 360 storing data in the CKD format and the first open system volume 370 storing data in the FBA format can be accessed from both the mainframe computer 100 and the open system computer 200, which are connected to the fist storage device controller 300.

A storage device controller system according to the present embodiment is described below.

=== First Storage Device Controller ===

As mentioned above, the first storage device controller 300 is connected to the mainframe computer 100 and the open system computer 200. The first mainframe system volume 360 storing data in the CKD format and the first open system volume 370 storing data in the FBA format can be accessed from either computer.

A channel controller (communications control means) A 310 is connected to the mainframe computer 100 and sends and receives data input/output commands and controls the input and output of data. A processor A 311 is in charge of the control of the channel controller A 310. A cache memory A 312 temporarily stores data that are sent and received between it and the mainframe computer 100. A control memory A 313 stores a control program A 318 for performing control of the processor A 311 and a dataset management table 317. One communications interface A 314 is connected to the mainframe computer 100 and another communications interface A 314 is connected to a second storage device controller 400. A disk interface A 315 is connected to a disk controller (input/output control means) A 340, a disk controller B 350, and a channel controller B 320 via an internal network 330.

The channel controller B 320 is connected to the open system computer 200 and sends and receives data input/output commands and controls the input and output of data. A processor B 321 is in charge of control of the channel controller B 320. A cache memory B 322 temporarily stores data sent and received between it and the open system computer 200. A control memory B 323 stores a control program B 328 for performing control of the processor B 321 and a file management table 327. One communications interface B 324 is connected to the open system computer 200 and another communications interface B 324 is connected to a third storage device controller 500. A disk interface B 325 is connected to the disk controller A 340, the disk controller B 350, and the channel controller A 310 via the internal network 330.

The internal network 330 connects the channel controller A 310, the channel controller B 320, the disk controller A 340, and the disk controller B 350 to one another.

The disk controller A 340 receives an instruction from the channel controller A 310 or the channel controller B 320, and controls the input and output of data stored on the first mainframe system volume 360 in the CKD format.

The disk controller B 350 receives an instruction from the channel controller A 310 or the channel controller B 320, and controls the input and output of data stored on the first open system volume 370 in the FBA format.

The first mainframe system volume 360 stores data in the CKD format. It can be a storage region that is logically structured on a physical storage region, but it can also be a physical storage region. Also, the first mainframe system volume 360 can be a single unit or a plurality of units. Furthermore, to increase the data reliability and the high-speed access properties, it can be configured as a RAID (redundant arrays of inexpensive disks).

The first open system volume 370 stores data in the FBA format. It can be a storage region that is logically structured on a physical storage region, but it can also be a physical storage region. Also, the first open system volume 370 can be a single unit or a plurality of units. Furthermore, to increase the data reliability and the high-speed access properties, it can be configured as a RAID.

It should be noted that as another example of the configuration of the first storage device controller 300, it is possible to adopt a configuration in which the data in the CKD format are converted into the FBA format at the channel controller A (310) or the disk controller A (340), so that on the first mainframe system volume 360 they are converted to the FBA format. In this case, data on the first mainframe system volume 360 are not intended for data readout from the open system computer 200, and since storing data in the CKD format as they are in that format is required for performance, the fact that they must be accessed via the open system data access program 102, for example, is the same.

=== Second Storage Device Controller ===

The second storage device controller 400 is provided with a channel controller C 410, a disk controller C 420, and a second mainframe system volume 430. It can also be provided with an internal network like the first storage device controller 300.

The second storage device controller 400 is different from the first storage device controller 300 in that it is not provided with an open system volume for storing data in the FBA format.

The channel controller C 410 is connected to the first storage device controller 300 and sends and receives data input/output commands and controls the input and output of data. A processor C 411 is in charge of control of the channel controller C 410. A cache memory C 412 temporarily stores data sent and received between it and the first storage device controller 300. A control memory C 413 stores a control program B 328 for performing control of the processor C 411. A communications interface C 414 is connected to the first storage device controller 300. A disk interface C 415 is connected to the disk controller C 420.

The disk controller C 420 receives commands from the channel controller C 410 and accesses data stored in the CKD format on the second mainframe system volume 430.

The second mainframe system volume 430 stores data in the CKD format. It can be a storage region that is logically structured on a physical storage region, but it can also be a physical storage region. Also, the second mainframe system volume 430 can be a single unit or a plurality of units. Furthermore, to increase the data reliability and the high-speed access properties, it can be configured as a RAID.

=== Third Storage Device Controller ===

The third storage device controller 500 is provided with a channel controller D 510, a disk controller D 520, and a second open system volume 530. It can also be provided with an internal network like the first storage device controller 300.

The third storage device controller 500 is different from the first storage device controller 300 in that it is not provided with a mainframe system volume for storing data in the CKD format.

The channel controller D 510 is connected to the first storage device controller 300 and sends and receives data input/output commands and controls the input and output of data. A processor D 511 is in charge of control of the channel controller D 510. A cache memory D 512 temporarily stores data sent and received between it and the first storage device controller 300. A control memory D 513 stores a control program for performing control of the processor D 511. A communications interface D 514 is connected to the first storage device controller 300. A disk interface D 515 is connected to the disk controller D 520.

The disk controller D 520 receives commands from the channel controller D 510 and accesses data stored in the FBA format on the second open system volume 530.

The second open system volume 530 stores data in the FBA format. It can be a storage region that is logically structured on a physical storage region, but it can also be a physical storage region. Also, the second open system volume 530 can be a single unit or a plurality of units. Furthermore, to increase the data reliability and the high-speed access properties, it can be configured as a RAID.

One possibility as the second storage device controller 400 and the third storage device controller 500 is a storage device controller for a computer system operating in a large-scale computer center, for example. Huge amounts of storage information have accumulated in such storage device controllers as the result of the operation of computers over many years. On the other hand, the introduction of new large-capacity storage device controllers is necessary to keep pace with the breakneck speed of technological advances and the explosive increase in the amount of information that is handled. In this case, although it is possible to completely replace the storage device controller, to allow past storage information from not only the mainframe computer but also from open-computers to be utilized necessitates that the data are transferred over to the new storage device controller.

With the storage device controller according to the present embodiment, the mainframe computer 100 and the open system computer 200 can both access data stored on conventional storage device controllers (the second storage device controller 400 and the third storage device controller 500) via a new storage device controller (first storage device controller 300). Moreover, the mainframe computer 100 can also access data stored on the third storage device controller 500, which conventionally it could not access. Also, the open system computer 200 can also access data stored on the second storage device controller 400, which conventionally it could not access.

The flow of the operation in a case where data stored on the second mainframe system volume 430 of the second storage device controller 400 are accessed from the open system computer 200 is described below according to the flowchart of FIG. 4.

=== Data Read Operation ===

If a dataset stored on a mainframe system volume (the first mainframe system volume 360 or the second mainframe system volume 430) is to be read, then the open system application program 201 designates the dataset name and issues a read command to the mainframe system data access program 202 (S1000). Then, the mainframe system data access program 202 designates the dataset and issues a read command to the channel controller B 320 connected to the open system computer 200 via a data transfer route B205 (S1001).

The transfer of data between the open system computer 200 and the channel controller B 320 via the data transfer route B 205 can be carried out according to a variety of protocols. For example, it is possible to adopt a fiber channel protocol, SCSI (small computer systems interface) protocol, or ISCSI (internet small computer systems interface) protocol, for example. It is also possible to provide several relay nodes or switches on the data transfer route B 205.

When the channel controller B 320 receives the data read command, the processor B 321 analyzes that data read command and determines that the data read command is for a dataset that is stored in the CKD format (S1002). The data read command is then transferred to the channel controller A 310 via the internal network 330 (S1003). When the channel controller A 310 receives the data read command, the processor A 311 references the dataset management table 317 stored on the control memory A 313 (S1004).

FIG. 2 shows the configuration of the dataset management table 317. The dataset management table 317 is a table for managing the storage location of data stored on the first mainframe system volume 360 and the second mainframe system volume 430 for each dataset.

A dataset name 610 indicates the dataset name of the data. A volume number 620 indicates the number of the storage volume in which the dataset is stored. A volume location 630 indicates the number of the storage device controller storing the storage volume. A data location 640 indicates the address at which the dataset is stored. If the data are in the CKD format, a cylinder number 641, a head number 642, and a record number 643 designate the data storage location.

When the processor A 311 references the dataset management table 317, the storage location of the dataset designated by the data read command received from the channel controller B 320 is determined (S1004). If the dataset is stored on the first mainframe system volume 360 (S1005), then the processor A 311 issues a dataset read command to the disk controller A 340 (S1006, S1007).

On the other hand, if the dataset is stored on the second mainframe system volume 430 (S1005), then the processor A 311 transfers the data read command that is received from the channel controller B 320 to the second storage device controller 400 via a data transfer route C 417 (S1008).

The protocol for transferring data over the data transfer route C 417 is in accordance with the second storage device controller 400. Representative examples of protocols that may be adopted include ESCON (registered trademark) and FICON (registered trademark). Of course, like with an open system, it is possible to adopt a fiber channel protocol, SCSI protocol, or ISCSI protocol, for example.

After receiving the data read command, the second device control device 400 reads the dataset from the designated address of the second mainframe system volume 430 via the disk controller C 420 (S1009). Then, the data that are read out are transferred to the first storage device controller 300 over the data transfer route C 417 (S1010).

The processor A 311 of the channel controller A 310 transfers those data to the channel controller B 320 via the internal network 330 (S1011). Then, the processor B 321 of the channel controller B 320 transmits the data to the mainframe system data access program 202 over the data transfer route B 205 (S1012).

The mainframe system data access program 202 converts the data from the CKD format to the FBA format and delivers them to the open system application program 201 (S1013, S1014). Here, it is also possible to make the channel controller B 320 perform the conversion of the read out data from the CKD format to the FBA format.

In this way, it is possible to perform the read out of data stored on the first mainframe system volume 360 or the second mainframe system volume 430 from the open system computer 200.

=== Data Write Operation ===

Next, the operation in a case where data are written to the first mainframe system volume 360 or the second mainframe system volume 430 from the open system computer 200 is described according to the flowchart of FIG. 5.

First, the open system application program 201 designates the dataset name and sends the write data and a write command to the mainframe system data access program 202 (S2000). The mainframe system data access program 202 then converts the data from the FBA format to the CKD format (S2001). Then, over the data transfer route B 205, the mainframe system data access program 202 sends the write data and a write command designating the dataset name to the channel controller B 320 connected to the open system computer 200 (S2002).

When the channel controller B 320 receives the write data and the data write command, the processor B 321 analyzes the data write command and determines that the data write command is for a dataset stored in the CKD format (S2003). Then, the data and the data write command are transferred to the channel controller A 310 via the internal network 330 (S2004). When the channel controller A 310 receives the write data and the data write command, the processor A 311 references the dataset management table 317 stored on the control memory A 313 and specifies the storage location of the dataset (S2005). If the storage location of the dataset is the first mainframe system volume 360 (S2006), then the processor A 311 sends the write data and the write command to the disk controller A 340 (S2007, S2008).

On the other hand, if the storage location of the dataset is the second mainframe system volume 430 (S2006), then the processor A 311 transfers the write data and the write command that are received from the channel controller B 320 to the second storage device controller 400 over the data transfer route C 417 (S2009).

The second storage device controller 400 that has received the write data and the data write command writes the write data to the designated address of the second mainframe system volume 430 via the disk controller C 420 (S2010).

Thus, it is possible to carry out the writing of data to the first mainframe system volume 360 or the second mainframe system volume 430 from the open system computer 200. It should be noted that the channel controller B 320 can also be made to carry out the conversion of the write data from the FBA format to the CKD format.

=== Data Read Operation ===

Next, the flow of the operation in a case where data stored on the second open system volume 530 of the third storage device controller 500 are accessed from the mainframe computer 100 is described below in accordance with the flowchart of FIG. 6.

If a file stored on an open system volume (the first open system volume 370 or the second open system volume 530) is to be read, then the mainframe system application program 101 designates the file name and issues a read command to the open system data access program 102 (S3000). Then, the open system data access program 102 issues a read command, designating the file name, to the channel controller A 310 connected to the mainframe computer 100 via a data transfer route A 105 (S3001).

The transfer of data between the mainframe computer 100 and the channel controller A 310 via the data transfer route A 105 can be carried out in accordance with various protocols. For example, it is possible to adopt ESCON (registered trademark) or FICON (registered trademark), for example. It is also possible to provide several relay nodes or switches on the data transfer route A 105.

When the channel controller A 310 receives the data read command, the processor A 311 analyzes that data read command and determines that the data read command is for a file that is stored in the FBA format (S3002). The data read command is then transferred to the channel controller B 320 via the internal network 330 (S3003). When the channel controller B 320 receives the data read command, the processor B 321 references the file management table 327 stored on the control memory B 323 (S3004).

FIG. 3 shows the configuration of the file management table 327. The file management table 327 is a table for managing the storage location of data stored on the first open system volume 370 and the second open system volume 530 for each file.

A file name 710 shows the file name of the data. A volume number 720 shows the number of the storage volume in which the file is stored. A volume location 730 shows the number of the storage device controller storing the storage volume. A data location 740 shows the address at which the file is stored. If the file is in the FBA format, the data storage location is designated by the LBA, and therefore the value of the LBA is entered.

When the processor B 321 references the file management table 327, the storage location of the file designated by the data read command received from the channel controller A 310 is determined (S3004). If the file is stored on the first open system volume 370 (S3005), then the processor B 321 issues a file read command to the disk controller B 350 (S3006, S3007).

On the other hand, if the file is stored on the second open system volume 530 (S3005), then the processor B 321 transfers the data read command that is received from the channel controller A 310 to the third storage device controller 500 via a data transfer route C 517 (S3008).

The protocol for transferring data over the data transfer route C 517 is in accordance with the third storage device controller 500. Examples of representative protocols include a fiber channel protocol, a SCSI protocol, or an ISCSI protocol.

After receiving the data read command, the third device control device 500 reads the file from the designated address of the second open system volume 530 via the disk controller D 520 (S3009). Then, the data that are read out are transferred to the first storage device controller 300 over the data transfer route C 517 (S3010).

The processor B 321 of the channel controller B 320 transfers the data to the channel controller A 310 via the internal network 330 (S3011). Then, the processor A 311 of the channel controller A 310 transmits the data to the open system data access program 102 over the data transfer route A 105 (S3012).

The open system data access program 102 converts the data from the FBA format to the CKD format and delivers them to the mainframe system application program 101 (S3013, S3014). Here, it is also possible to make the channel controller A 310 perform the conversion from the FBA format to the CKD format of the read out data.

In this way, it is possible to carry out the read out of data stored on the first open system volume 370 or the second open system volume 530 from the mainframe system computer 100.

=== Data Write Operation ===

Next, the operation in a case where data are written to the first open system volume 370 or the second open system volume 530 from the mainframe system computer 100 is described according to the flowchart of FIG. 7.

First, the mainframe system application program 101 designates the file name and sends the write data and a write command to the open system data access program 102 (S4000). The open system data access program 102 then converts the data from the CKD format to the FBA format (S4001). Then, over the data transfer route A 105, the open system data access program 102 sends the write data and a write command designating the file name to the channel controller A 310 connected to the mainframe computer 100 (S4002).

When the channel controller A 310 receives the write data and the data write command, the processor A 311 analyzes the data write command and determines that the data write command is for a file stored in the FBA format (S4003). Then, the data and the data write command are transferred to the channel controller B 320 via the internal network 330 (S4004).

When the channel controller B 320 receives the write data and the data write command, the processor B 321 references the file management table 327 stored on the control memory B 323 and specifies the storage location of the file (S4005). If the storage location of the file is the first open system volume 370 (S4006), then the processor B 321 sends the write data and the write command to the disk controller B 350 (S4007, S4008).

On the other hand, if the storage location of the file is the second open system volume 530 (S4006), then the processor B 321 transfers the write data and the write command that are received from the channel controller A 310 to the third storage device controller 500 over the data transfer route D 517 (S4009).

The third storage device controller 500 that has received the write data and the data write command writes the write data to the designated address of the second open system volume 530 via the disk controller D 520 (S4010).

Thus, it is possible to carry out the writing of data to the first open system volume 370 or the second open system volume 530 from the mainframe computer 100. It should be noted that the channel controller A 310 may also carry out the conversion of the write data from the CKD format to the FBA format.

=== Other Configuration Examples ===

In the example configuration shown in FIG. 1, the first storage device controller was connected to the second storage device controller and the third storage device controller. However, it is also possible to adopt a configuration in which it is connected to only either the second storage device controller or the third storage device controller.

Also, in the example configuration shown in FIG. 1, the second storage device controller has only a storage volume that can be accessed in the CKD format and the third storage device controller has only a storage volume that can be accessed in the FBA format. However, it is also possible to adopt a configuration in which both or only one of the second storage device controller and the third storage device controller, like the first storage device controller, have a storage volume that can be accessed in the FBA format and a storage volume that can be accessed in the CKD format.

Moreover, in the example configuration shown in FIG. 1, the first storage device controller has a storage volume that can be accessed in the FBA format and a storage volume that can be accessed in the CKD format; however, it is also possible to adopt a configuration in which it has only a storage volume that can be accessed in one of these two formats.

Furthermore, the present embodiment was described using the CKD format and the FBA format as examples. However, other recording formats can also be adopted.

Although a preferred embodiment has been described above, the foregoing embodiment is for elucidating the present invention and is not to be construed as limiting the present invention. The present invention can be altered and improved without departing from gist thereof, and includes functional equivalents.

What is claimed is:

1. A control method for a storage device controller system, the storage device controller system comprising:
    a first storage device controller having a first input/output control module for performing input/output processing with respect to a fist storage device storing data in accordance with a CKD (Count Key Data) recording format, and a first communications control module for receiving data input/output requests from a first information processing device for accessing data stored on said first storage device; and a second storage device controller having a second input/output control module for performing input/output processing with respect to a second storage device storing data in accordance with said CKD recording format, and a second communications control module for receiving input/output requests with respect to data stored on said second storage device;

wherein said first communications control module and said second communications control module are connected;

said control method comprising:

said first storage device controller receiving a data read request from said first information processing device; and said first storage device controller determining whether said data read request is for data stored on said second storage device; and if it is determined that said data read request is for data stored on the second storage device, then said first storage device controller transmitting said data read request to said second storage device controller;

said second storage device controller reading out data stored on said second storage device and transmitting said data to the first storage device controller; and said first storage device controller transmitting said data to said first information processing device.

2. A control method for a storage device controller system according to claim 1, wherein said first storage device controller further comprises a third input/output control module for performing input/output processing with respect to a third storage device storing data in accordance with a third recording format, and a third communications control module for receiving data input/output requests from a second information processing device for accessing data stored on said third storage device.

3. A control method for a storage device controller system according to claim 1, wherein said first storage device controller transmitting said data to said first information processing device comprises transmitting said data to said first information processing device after converting them to data according to an FBA (Fixed Block Architecture) recording format, if said data read request is based on said FBA recording format.

4. A control method for a storage device controller system according to claim 1, wherein said first storage device controller has a third storage device storing data in accordance with an FBA recording format.

5. A control method for a storage device controller system according to claim 1, wherein said first storage device controller can convert data from said CKD recording format to an FBA recording format.

6. A control method for a storage device controller system, the storage device controller system comprising:

a first storage device controller having a first input/output control module for performing input/output processing with respect to a first storage device storing data in accordance with a CKD (Count Key Data) recording format, and a first communications control module for receiving data input/output requests from a first information processing device for accessing data stored on said first storage device; and a second storage device controller having a second input/output control module for performing input/output processing with respect to a second storage device storing data in accordance with said CKD recording format, and a second communications control module for receiving input/output requests with respect to data stored on said second storage device;

wherein said first communications control module and said second communications control module are connected;

said control method comprising:

said first storage device controller receiving a data write request from said first information processing device; and said first storage device controller determining whether said data write request is for said second storage device; and if it is determined that said data write request is for said second storage device, then said first storage device controller transmitting said data write request to said second storage device controller;

said first storage device controller transmitting write data received from said first information processing device to said second storage device controller; and said second storage device controller writing said write data to said second storage device.

7. A control method for a storage device controller system according to claim 6, wherein said first storage device controller further comprises a third input/output control module for performing input/output processing with respect to a third storage device storing data in accordance with a third recording format, and a third communications control module for receiving data input/output requests from a second information processing device for accessing data stored on said third storage device.

8. A control method for a storage device controller system according to claim 6, wherein said first storage device controller transmitting write data received from said first information processing device to said second storage device controller comprises transmitting write data received from said first information processing device to said second storage device controller after converting them to data in accordance with an FBA (Fixed Block Architecture) recording format, if said data write request is based on said FBA recording format.

9. A control method for a storage device controller system according to claim 6, wherein said first storage device controller has a third storage device storing data in accordance with a FBA recording format.

10. A control method for a storage device controller system according to claim 6, wherein said first storage device controller can convert data from the CKD recording format to an FBA recording format.

11. A storage device controller system comprising:

a first storage device controller having a first input/output control module for performing input/output processing with respect to a fist storage device storing data in accordance with a CKD (Count Key Data) recording format, and a first communications control module for receiving data input/output requests from a first information processing device for accessing data stored on said first storage device; and a second storage device controller having a second input/output control module for performing input/output processing with respect to a second storage device storing data in accordance with said CKD recording format, and a second communications control module for receiving input/output requests with respect to data stored on said second storage device;

wherein said first communications control module and said second communications control module are connected;

wherein said first storage device controller comprises:
means for receiving a data read request from said first information processing device;
means for determining whether said data read request is for data stored on said second storage device;
means for transmitting said data read request to said second storage device controller if it is determined that said data read request is for data stored on said second storage device; and
means for transmitting to said first information processing device said data stored on said second storage device that are transmitted from said second storage device controller; and
wherein said second storage device controller comprises:
means for reading out data stored on said second storage device and transmitting said data to said first storage device controller based on said data read request that is transmitted from said first storage device controller.

12. A storage device controller system according to claim 11, wherein the first storage device controller further comprises a third input/output control module for performing input/output processing with respect to a third storage device storing data in accordance with a third recording format, and a third communications control module for receiving data input/output requests from a second information processing device for accessing data stored on said third storage device.

13. A storage device controller system according to claim 11, wherein said means for transmitting to said first information processing device said data stored on said second storage device that are transmitted from said second storage device controller comprises means for converting data stored on said second storage device that are transmitted from said second storage device into data in accordance with said CKD recording format and then transmitting them to said first information processing device.

14. A storage device controller system according to claim 11, wherein said first storage device controller has a third storage device storing data in accordance with an FBA recording format.

15. A storage device controller system according to claim 11, wherein said first storage device controller can convert data from said CKD recording format to an FBA recording format.

16. A storage device controller system according to claim 11,
wherein said first storage device controller comprises:
means for receiving a data write request from said first information processing device;
means for determining whether said data write request is for said second storage device;
means for transmitting said data write request to said second storage device controller if it is determined that said data write request is for said second storage device; and
means for transmitting write data that are received from said first information processing device to said second storage device controller; and
wherein said second storage device controller comprises:
means for writing said write data to said second storage device.

17. A storage device controller system according to claim 16, wherein said means for transmitting write data that are received from said first information processing device to said second storage device controller comprises means for converting write data received from said first information processing device into data in accordance with said CKD recording format and then transmitting them to said second storage device controller.

18. A storage device controller system according to claim 16, wherein said first storage device controller has a third storage device storing data in accordance with a FBA recording format.

19. A storage device controller system according to claim 16, wherein said first storage device can convert data from the CKD recording format to an FBA recording format.

* * * * *